March 27, 1973 D. H. KNOWLES ET AL 3,723,082
SHEET GLASS THICKNESS CONTROL
Filed Jan. 6, 1971 2 Sheets-Sheet 1

INVENTORS.
Daniel H. Knowles
George D. Lapinsky
Kenneth T. Overman
Raphael A. Simon
BY
Burton R. Turner
ATTORNEY

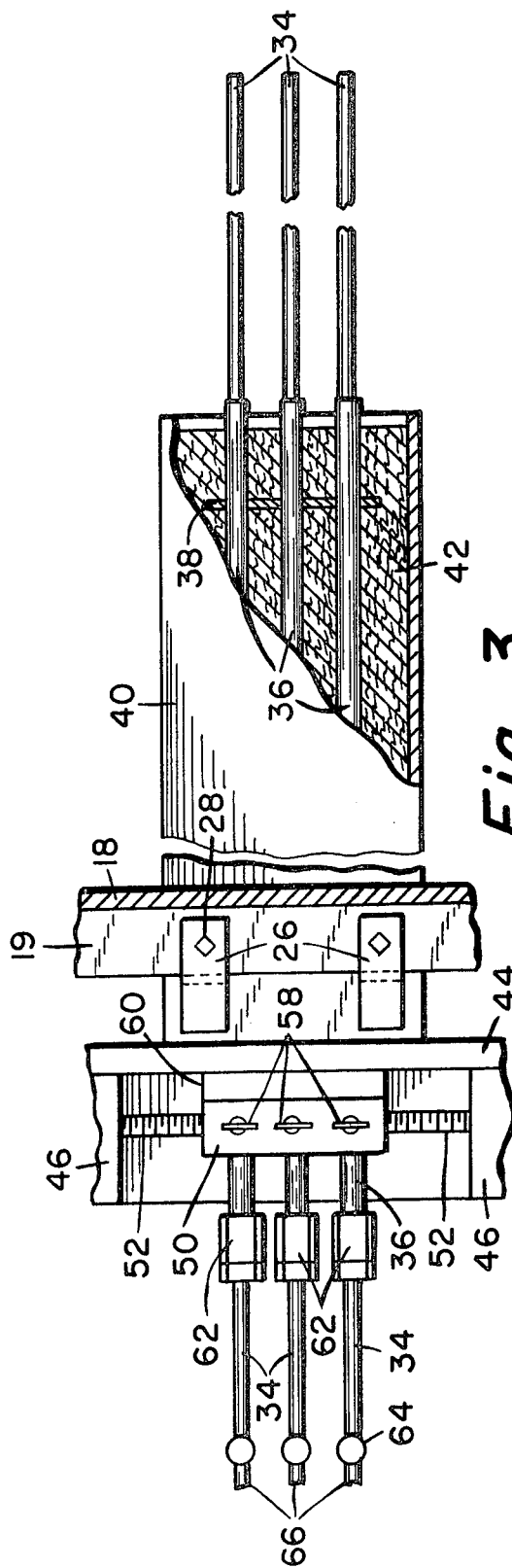
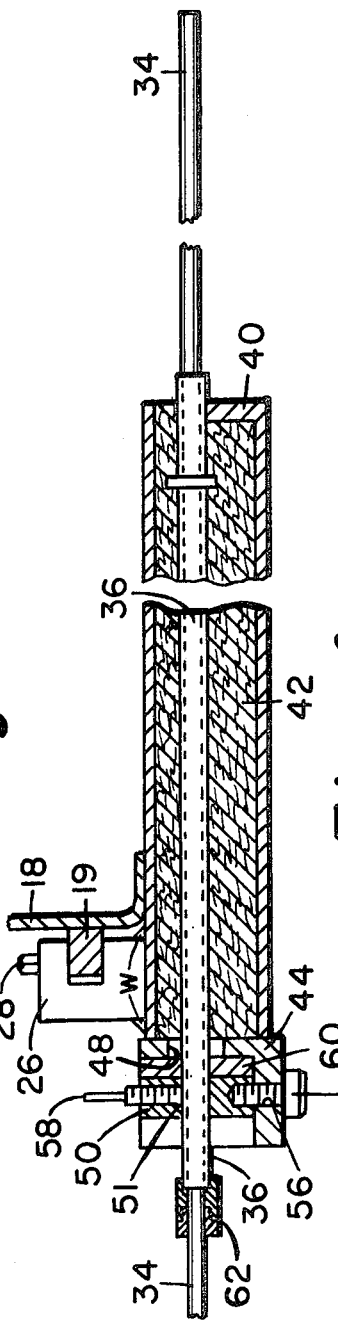

3,723,082
SHEET GLASS THICKNESS CONTROL
Daniel H. Knowles, Painted Post, George D. Lapinsky, Corning, Kenneth T. Overman, Painted Post, and Raphael A. Simon, Corning, N.Y., assignors to Corning Glass Works, Corning, N.Y.
Filed Jan. 6, 1971, Ser. No. 104,413
Int. Cl. C03b 17/00
U.S. Cl. 65—84          4 Claims

ABSTRACT OF THE DISCLOSURE

In the formation of sheet material from molten glass, a plurality of spot cooling jets are positioned in the forming area, and preferably in a row along the draw line, for directing individual streams of extremely low volume air on discrete portions of the molten glass adjacent to the draw line to control local thickness variations in the sheet and thereby provide uniform glass thickness across its extent.

BACKGROUND OF THE INVENTION

When molten glass is drawn into sheet form, the glass is stretched or attenuated from an initial delivered thickness to a final sheet thickness. In the overflow-downdraw process, wherein molten glass flows downwardly along opposed converging sides of a forming member and is withdrawn as a single sheet from the root or bottom edge thereof, the initial thickness of the glass is measured close to the bottom edge of the forming member, which represents the draw line in such an operation. The obtainment of thickness uniformity has been a problem in both updraw and downdraw processes wherein the thickness characteristics of the final sheet are determined during the attenuation process by both the uniformity of initial thickness and by the uniformity of the glass viscosity. That is, a given thickness variation in the final sheet may be the result of inaccurate metering, imperfections in the glass-contacting sides of the forming member, or by imbalances in the temperature environment of the glass which cause imperfections in the viscosity profile of the glass flowing toward the draw line.

Thickness variation in sheet glass is a problem which has been considered by the industry to be inherent in the sheet drawing processes, and may manifest itself in several general types of defects, such as wedge, long period wave variations, and short period wave variations. Wedge is a gross thickness variation in which the sheet is thicker at one edge than the other. Long wave variations are those which have considerable amplitude and extent, such as in excess of several inches, and can be measured by gageing the sheet along a path in a direction transverse to the direction of the draw. Short wave variations are of small amplitude and pitch, such as about three inches or less, and are generally superimposed on the long wave variations. The present invention is directed to the elimination of or substantial reduction in the general type of thickness variation identified as short wave variation having a pitch of several inches or less.

It has been found that in order to make distortion-free sheet glass, it is necessary to minimize or compensate for local temperature variations or fluctuations within and around the glass in the zone of sheet formation. Such local variations in temperature in the vicinity of the draw line cause waves, or alternate thick and thin portions running longitudinally of the vertically drawn sheet. The longitudinal waves or thickness variations, in turn, cause distortion which is highly objectionable from an optical standpoint, particularly when objects are viewed through the glass at a sharp angle to the waves.

Virtually any thickness defect may be corrected by changing the viscosity of the glass as it is being stretched or attenuated to its final thickness, whether the defect be caused by improper metering, poor forming surface, or undesirable thermal conditions, as long as the defect is constant with time. It is important however that apparatus be utilized which provides precise incremental or individual thermal control over a plurality of narrow longitudinal bands which extend parallel to the draw. In addition, the apparatus must have sufficient portability and adjustability so as to be positioned in operative relationship adjacent the glass draw line, but it must not produce secondary cooling effects such as convection currents adjacent the molten glass forming the sheet which would deleteriously create uneveness or waviness in the sheet running parallel to the direction in which it is being drawn.

DESCRIPTION OF THE PRIOR ART

Various attempts have been made in the past to provide sheet glass with uniform thickness. As shown in U.S. Pat. No. 1,829,641, water cooled members were utilized in a downdrawn sheet drawing process to cool border sections of the glass streams, so that when the sheet was discharged from the lower end of the forming member it would be rigid enough to overcome the natural tendency to narrow. Pat. No. 3,223,502 discloses the use of both electrical heater segments and cooling tubes directed toward a molten bath in a updraw process, to affect the viscosity of the glass going into the gather for the sheet and thereby produce a selective change in glass thickness. In U.S. Pat. No. 3,317,300, uniform thickness of glass ribbon produced by an updraw process is obtained by the differential blowing of air toward the surface of the glass bath in a chamber which feeds the draw pot. However, none of these prior art devices is capable of effectively controlling thickness uniformity wherein the thickness defect is a short wave variation having a pitch of several inches or less.

The cooling members of Pat. No. 1,829,641 do not provide uniform thickness across the width of the sheet glass, but are merely utilized to prevent the narrowing or necking in of the edge portions of the downwardly drawn sheet. The electric heater segments and continuous cooling tube members of Pat. No. 3,223,502 relating to the updraw process, on the other hand, are part of a fixed or rigid structure within the glass drawing apparatus, and accordingly have no versatility or mobility.

Further, the continuous loop cooling means, being positioned longitudinally along the surface of the bath, has the undesirable effect of producing a differential two-line cooling pattern over the surface of the glass. That is, as the coolant enters one leg of the longitudinally-extending loop, it cools a strip or line of glass therebelow while absorbing heat from the glass. Accordingly, the cooling effect produced on the glass along a line under the flow through the return leg is substantially less than that produced by the entrance leg. Also, since the cooling loops are permanently mounted adjacent the molten glass bath, it is necessary to maintain some flow of coolant therethrough at all times in order to protect the tubes from the heat of the bath, even though cooling may not be required for the glass operation. Finally, an extended time delay is usually occasioned with such water systems between the initial cooling application to the molten bath and the resulting effect produced on the drawn glass sheet.

The high velocity air jets utilized in U.S. Pat. No. 3,317,300 are not completely satisfactory since the cooling is effected at a substantial distance upstream from the actual draw line, and accordingly interim thermal upsets could affect the drawn sheet. Further, the velocity of air injected into the forming zone has a tendency to produce a chimney effect adjacent the newly formed ribbon which deleteriously affects thickness variation and waviness in the sheet running parallel to the direction in which it is being drawn.

Although it is well recognized in the prior art that the introduction of air currents within the forming zone should be avoided in order to inhibit the formation of a chimney effect along the sheet, the present invention has overcome this stigma by introducing incrementally small jets of air or other gas at an extremely low flow rate thereby providing incremental cooling and effecting thickness uniformity across the width of the sheet without introducing deleterious secondary effects.

SUMMARY OF THE INVENTION

Briefly, this invention relates to a new method and apparatus for providing a uniform temperature profile across a desired width of glass sheet adjacent to its draw line so as to control thickness variations defects having a pitch of about 3" or less by controlling the viscosity of the glass as it is being attenuated to its final thickness and thereby obtaining uniformity of thickness in the final sheet. The apparatus includes a plurality of fluid-conducting tubes or cooling jets positioned in the forming zone of a glass sheet drawing operation. Preferably, the cooling jets are positioned within a row so as to direct the impingement of small air or other gas jets upon the molten glass in incremental areas along a row adjacent the line of draw. Of significant importance to the operation is the fact that the amount of gaseous media discharged by the jets is of such a relatively small magnitude so as to not create secondary turbulence or induce a chimney effect through stray convection currents. That is, the air flow rate is maintained below two standard cubic feet per hour (2 s.c.f.h.) per cooling jet tube, in order to avoid the inducement of secondary effects which may otherwise be occasioned through turbulence and convection flow.

The amount of cooling produced by this minimal flow rate is relatively small, however it must be borne in mind that this incremental cooling is not for the purpose of generally reducing the overall temperature of the sheet, but rather for incrementally cooling specific areas which have become too thin and fluid so as to thicken such areas by as much as 10% of the sheet thickness and thereby help provide thickness uniformity in a desired section across the width of the sheet.

It thus has been an object of the present invention to improve the optical quality of the newly formed sheet glass by providing improved incrementally controlled cooling for eliminating thickness defects having a pitch length of about three inches or less which contribute to optical distortion.

A further object of the invention has been to provide improved method and apparatus for precisely controlling thickness uniformity across the prescribed width of newly formed sheet glass by utilizing an extremely low flow rate of cooling air directly upon incremental sections of the sheet without inducing secondary deleterious cooling effects.

BRIEF DESCRIPTION OF THE DRAWINGS

FIG. 3 is a top plan view, partially broken away, of the spot cooling jet apparatus shown in FIG. 2.

FIG. 4 is an elevational view in section of the cooling apparatus shown in FIG. 3.

DESCRIPTION OF THE PREFERRED EMBODIMENTS

Figure 1:
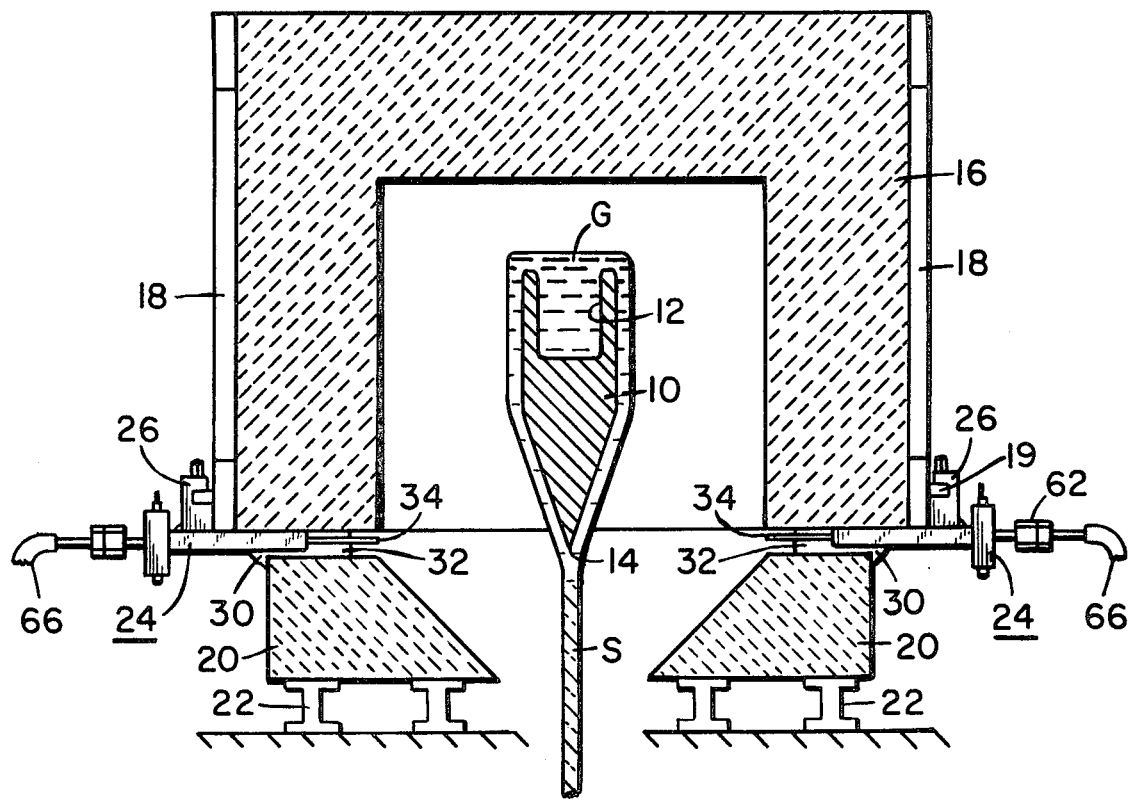
FIG. 1 is an elevational view in section illustrating the positionment of the improved cooling apparatus of the present invention in a downdraw glass sheet forming operation.

Referring now to the drawings, and particularly FIG. 1, the spot-cooling apparatus of the present invention is shown in operative position relative to a downdraw sheet forming operation. As shown, molten glass G is fed to a forming member 10 and overflows an upper well or trough 12 so as to form two opposed streams which flow downwardly along opposite sides of the forming member 10 to form a unitary glass sheet S adjacent the root or drawline 14 of the forming member. The forming member is positioned within a refractory housing or muffle 16 having structural support members 18. Refractory doors 20, which may be moved inwardly and outwardly along support rails 22, are positioned below the housing 16 along opposite faces of the sheet glass S.

Spot cooling units 24 are shown in position between the muffle 16 and the refractory door members 20 on opposite sides of molten material forming sheet glass S. Each cooling unit 24 is supported on a horizontal bar section 19 of structural support members 18 by means of C-clamps 26 having tightening or locking means 28. In order to prevent air leakage or drafts within the housing 16, the spot cooling units are sealed between the door members and the housing by means of suitable refractory material such as refractory mud 30 and mineral wool fibers 32.

As shown particularly in FIG. 3, each spot cooling unit 24 has a plurality of cooling tubes or jets 34 positioned in equally spaced-apart relationship substantially within a horizontal plane so that their outer ends may lie within a line substantially parallel with the drawline of the forming unit. In order to be an effective thickness controller, the total distance between the spaced apart tubes must be less than the pitch length of the defect being corrected. A supporting tube or fixture 36 encloses a portion of each cooling tube 34, and a bracket or positioner 38 maintains the various supporting tubes in a substantially parallel spaced-apart relationship. A housing 40 encloses the support tubes 36 of each set of cooling tubes 34, and is provided with an insulating refractory packing 42 such as mineral wool blanket insulation.

Figure 2:
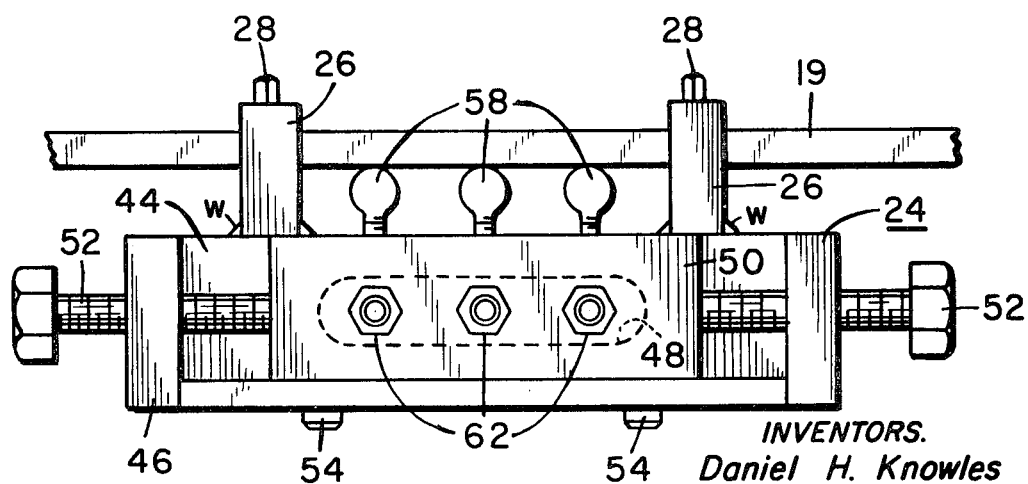
FIG. 2 is an end elevational view of the improved spot cooling apparatus shown in FIG. 1.

As shown in FIGS. 2 and 4, the C-clamps 26 are welded at w to the upper surface of the housing 40, and are adjustably secured to the horizontal bar 19 of support 18 by means of tightening bolts 28. The outer end wall of housing 40 is provided with an L-shaped bracket 44 having a pair of end blocks 46 and a longitudinal horizontal slot 48 communicating with the interior of the housing 40. The spaced support tubes 36, each containing a cooling tube 34, not only project through the slot 48, but also through spaced-apart openings 51 in a positioner block 50, which is adjustably mounted on bracket 44 between end blocks 46. As shown particularly in FIGS. 2 and 3, the positioner block 50 is horizontally positioned between end blocks 46 by screw adjustment means 52. A pair of tightening means 54, which extend through slots 56 in the bottom of bracket 44, project into the bottom of positioner block 50 so as to retain the positioner block in a desired lcation as determined by screw adjustment means 52. A lock-screw 58 is provided for each opening 51 in positioner block 50 so as to retain the longitudinal or "in and out" position of support tube 36 passing therethrough. A mineral fiber board sliding seal 60 is provided between positioner block 50 and the front wall of bracket 44 so as to seal the longitudinal slot 48 irrespective of the horizontal positioning of tubes 36 therewithin.

An air-seal fitting 62 having an asbestos packing therewithin is provided at the outer end of each support tube 36 so as to retain an airtight seal between each cooling jet tube 34 and its support tube 36. A flowmeter 64, such as a standard Fischer and Porter meter Catalog No. 10A1347N23B having a scale of from 0 to 1.9 standard cubic feet per hour is shown in FIG. 3 as being connected between a gaseous media supply line 66 and each cooling tube 34.

Although the operation of the present invention will be obvious to those skilled in the art from the foregoing disclosure, the following specific example, not limiting in nature, is given as one illustration of the operation. A plurality of three cooling tubes of stainless steel having an outside diameter of ⅛ inch and an inside diameter of 1/16 inch were positioned approximately ¾ of an inch apart between their longitudinal centerlines, with the discharge end of each such tube being positioned at a distance of approximately 8 inches from the root of an overflow glass forming member. The molten glass adjacent the end of the three aligned cooling tubes exhibited a thin area or valley about .0003 inch deep with a pitch length of less than about 3 inches. Air at a flow rate of about .75 cubic foot per hour was supplied to each of the three cooling tubes by means of flowmeters positioned in the air supply line to each tube, and each tube produced a flow impingement area on the molten glass having a diameter of about ¾". The thickness defect was virtually eliminated within several minutes after initially applying the air, and thereafter thickness uniformity was retained by maintaining the desired air flow at the designated location. Although virtually any commercially feasible glass flow rate may be utilized, the molten glass of the example was delivered with a viscosity of approximately 250,000 poises and at a flow rate at the apex of approximately 25 pounds per inch of sheet width per hour.

It will be apparent to those skilled in the art that the number of cooling tubes in an array may vary as desired from a minimum of 1 to a maximum which will conveniently fit within and react upon the relatively small pitch length involved. The effective area of flow impingement upon the molten glass forming the sheet may be varied by adjusting the longitudinal positionment of tubes 34 relative to the sheet by means of lock screws 58 operating on the tubes within openings 51. That is a smaller more concentrated impingement area is provided by longitudinally positioning the tubes toward the sheet, whereas a broader impingement area is obtained by increasing the space between the tube ends and the sheet. Further, the external outlet end of each cooling tube may not necessarily be circular, but may be pre-formed with a desired flow configuration such as a flare or slot. Finally, as will be appreciated, the invention not only has applicability to downdraw processes, but also may be utilized for providing thickness uniformity in updraw processes and correct thickness defects having a pitch length of less than about 3 inches.

Although we have disclosed the now preferred embodiments of our invention, it will be apparent to those skilled in the art that various changes and modifications may be made thereto without departing from the spirit and scope thereof as defined in the appended claims.

We claim:

1. A method of improving the optical quality of sheet glass by controlling the optical distortion-producing thickness defects having a pitch length of less than about three inches which comprises, detecting localized thinness areas across the width of newly formed sheet glass, applying a plurality of cooling gaseous streams upon the newly formed sheet glass adjacent the glass draw line thereof in sufficient quantity to cover the extent of such localized thinness, regulating the flow of each such cooling stream to a maximum of two standard cubic feet per hour so as to avoid the inducement of secondary turbulence and convection flow affects while providing the cooling flow necessary to virtually eliminate localized glass variations in the finished sheet glass product, and maintaining such flow rate as is necessary to control such variations.

2. The method as defined in claim 1 wherein the flows are applied in equally spaced-apart increments within a given distance across the horizontal width of the newly formed sheet which is less than the pitch length of the optical defect being corrected.

3. Apparatus for improving the optical quality of newly formed sheet glass by controlling the optical distortion-producing localized thickness defects having a pitch length of less than about three inches which comprises, a plurality of spot cooling means each mounted for impinging at least one discrete stream of low velocity gaseous media upon a designated area of flowable glass material adjacent the draw line of a sheet forming operation, means for regulating the flow rate of each such stream below a maximum of about two standard cubic feet of gaseous media per hour, means for varying the effective impingement area of each such stream upon said glass by adjustably positioning each said spot cooling means in a predetermined location with respect to a designated area across the width of the material forming the sheet glass, said plurality of spot cooling means including a plurality of cooling jet tubes arranged in a spaced-apart placement so as to form a row adjacent the draw line of the newly formed sheet material, and said means for positioning said spot cooling means including means for adjusting the longitudinal position of an outlet end of said cooling jet tubes with respect to such draw line so as to form a smaller more concentrated impingement area on said sheet when said tubes are positioned toward said sheet and to form a broader impingement area on said sheet when said tubes are positioned away from said sheet.

4. Apparatus as defined in claim 3 including a plurality of spaced-apart cooling tubes each supplied with its own controlled source of air, a horizontally adjustable positioner block adjacent one end of said spot cooling means, and said cooling tubes lockably projecting through said positioner block in spaced-apart relationship in such a manner so that horizontal adjustment of said block will provide a desired horizontal adjustment of said cooling tubes with respect to the molten glass forming the newly produced sheet, and said tubes being longitudinally adjustable within said positioner block to thereby provide a more concentrated impingement area or broader impingement area on said sheet as desired.

References Cited

UNITED STATES PATENTS 3,563,719  10/1967  Sleighter et al. _____ 65—204 X

FOREIGN PATENTS 826,598  11/1969  Canada _____ 65—84

ARTHUR D. KELLOGG, Primary Examiner

U.S. Cl. X.R.

65—162, 195, 204, 351